United States Patent
Katsura et al.

(10) Patent No.: US 12,288,015 B2
(45) Date of Patent: Apr. 29, 2025

(54) METHOD OF DESIGNING INTERNAL STRUCTURE OF FOAMED RESIN SOUND ABSORBING MATERIAL, DEVICE OF DESIGNING THE SAME, AND METHOD OF CALCULATING ACOUSTIC CHARACTERISTICS OF FOAMED RESIN SOUND ABSORBING MATERIAL

(71) Applicants: MAZDA MOTOR CORPORATION, Hiroshima (JP); KOGAKUIN UNIVERSITY, Tokyo (JP)

(72) Inventors: Daiji Katsura, Hiroshima (JP); Keisuke Yamakawa, Hiroshima (JP); Takashi Yamamoto, Tokyo (JP)

(73) Assignees: MAZDA MOTOR CORPORATION, Hiroshima (JP); KOGAKUIN UNIVERSITY, Tokyo (JP)

( * ) Notice: Subject to any disclaimer, the term of this patent is extended or adjusted under 35 U.S.C. 154(b) by 836 days.

(21) Appl. No.: 17/480,996

(22) Filed: Sep. 21, 2021

(65) Prior Publication Data
US 2022/0100934 A1 Mar. 31, 2022

(30) Foreign Application Priority Data
Sep. 28, 2020 (JP) .................. 2020-162078

(51) Int. Cl.
*G06F 30/28* (2020.01)
*G01N 29/44* (2006.01)
(Continued)

(52) U.S. Cl.
CPC ......... *G06F 30/28* (2020.01); *G01N 29/4472* (2013.01); *G10K 11/162* (2013.01);
(Continued)

(58) Field of Classification Search
CPC . G06F 30/28; G06F 2111/10; G01N 29/4472; G01N 2291/0289; G10K 11/162; B60R 13/0838
See application file for complete search history.

(56) References Cited

U.S. PATENT DOCUMENTS
2014/0340406 A1 11/2014 Hirosawa

FOREIGN PATENT DOCUMENTS
| JP | H11-053414 A | 2/1999 |
| JP | 2009-134976 A | 6/2009 |
| JP | 2014-232121 A | 12/2014 |

OTHER PUBLICATIONS

Gholami, Mohammad S., Olivier Doutres, and Noureddine Atalla. "Optimization of acoustic performance of highly porous polyurethane foam using micro-structural based model." In Inter-Noise and Noise-Con Congress and Conference Proceedings, vol. 254, No. 1, pp. 1030-1037. Institute of Noise Control Eng (Year: 2017).*

Doutres O, Atalla N, Dong K. Effect of the microstructure closed pore content on the acoustic behavior of polyurethane foams. Journal of Applied Physics. Sep. 15, 2011;110(6). (Year: 2011).*

Gao K, Van Dommelen JA, Göransson P, Geers MG. A homogenization approach for characterization of the fluid-solid coupling parameters in Biot's equations for acoustic poroelastic materials. Journal of Sound and Vibration. Sep. 1, 2015;351:251-67. (Year: 2015).*

(Continued)

*Primary Examiner* — Chuen-Meei Gan
(74) *Attorney, Agent, or Firm* — Studebaker Brackett PLLC

(57) ABSTRACT

A method of designing an internal structure of a foamed resin sound absorbing material includes: setting a microscopic structure model with a structure equivalent to the internal structure of the foamed resin sound absorbing material; calculating an acoustic characteristic by homogenization for each of a plurality of microscopic structure models, each being the microscopic structure model; identifying a relational expression between a Biot's parameter of the foamed resin sound absorbing material and the microscopic structure model; setting a target acoustic characteristic; identifying a Biot's parameter for achieving the target acoustic characteristic set, by Biot's modeling; and identi- (Continued)

fying a microscopic structure model corresponding to the Biot's parameter identified.

9 Claims, 4 Drawing Sheets

(51) Int. Cl.
    *G10K 11/162*     (2006.01)
    *B60R 13/08*     (2006.01)
    *G06F 111/10*     (2020.01)
(52) U.S. Cl.
    CPC .. *B60R 13/0838* (2013.01); *G01N 2291/0289* (2013.01); *G06F 2111/10* (2020.01)

(56) References Cited

OTHER PUBLICATIONS

Takashi Yamamoto, Optimization of Microstructure of Sound-absorbing Poroelastic Material by Homogenization Method, Society of Automotive Engineers of Japan, Inc., Annual Congress (Spring 2018) Proceedings, Document No. 20185332.

Yamamoto, T., Maruyama, S., Terada, K., Izui, K. and Nishiwaki, S., A generalized macroscopic model for sound-absorbing poroelastic media using the homogenization method, Computer Methods in Applied Mechanics and Engineering, vol. 200, (2011), pp. 251-264.

\* cited by examiner

METHOD OF DESIGNING INTERNAL STRUCTURE OF FOAMED RESIN SOUND ABSORBING MATERIAL, DEVICE OF DESIGNING THE SAME, AND METHOD OF CALCULATING ACOUSTIC CHARACTERISTICS OF FOAMED RESIN SOUND ABSORBING MATERIAL

CROSS-REFERENCE TO RELATED APPLICATION

This application claims priority to Japanese Patent Application No. 2020-162078 filed on Sep. 28, 2020, the entire disclosure of which is incorporated herein by reference.

BACKGROUND ART

The technique disclosed herein relates to a method of designing the internal structure of a foamed resin sound absorbing material, a device of designing the same, and a method of calculating the acoustic characteristics of the foamed resin sound absorbing material.

Japanese Unexamined Patent Publication No. 2009-134976 describes a method of analyzing a gas-liquid two phase flow in a porous structure by homogenization method (hereinafter homogenization).

Japanese Unexamined Patent Publication No. H11-053414 describes, as a material designing technique by homogenization, a method of designing a material by a combined analysis of molecular simulation and homogenization.

US 2014/0340406 A1 describes that the acoustic performance of a porous fibrous material such as glass wool can be calculated using a Biot's model.

The following paper describes a method of designing a porous fibrous sound absorbing material. This design method is a combination of the homogenization and the method using Biot's model (hereinafter Biot's modeling).

Takashi Yamamoto, Optimization of Microstructure of Sound-absorbing Poroelastic Material by Homogenization Method, Society of Automotive Engineers of Japan, Inc., Annual Congress (Spring 2018) Proceedings, Document No. 20185332

Specifically, in this design method, a porous fibrous sound absorbing material is modeled using a non-contact parallel fiber model, and the acoustic characteristics of a plurality of models are calculated by the homogenization. Based on the calculated acoustic characteristics, the relational expressions between Biot's parameters of the porous fibrous sound absorbing material and the model are identified.

The Biot's parameters of the porous fibrous sound absorbing material which serve as target acoustic characteristics are then identified by the Biot's modeling. Based on the identified Biot's parameters and the relational expressions described above, a model with the target acoustic characteristics is identified.

By the homogenization, the acoustic characteristics can be predicted from the microscopic structure of the porous sound absorbing material. However, the calculation of the acoustic characteristics by the homogenization requires a high calculation load. It takes thus a long time to design a porous sound absorbing material only by the homogenization.

The Biot's modeling uses Biot's parameters indicating the macro-characteristics of a material to calculate the acoustic characteristics. By the Biot's modeling, the acoustic characteristics can be calculated at lower calculation costs.

However, the Biot's modeling fails to handle the microscopic structure of the porous sound absorbing material. Only by the Biot's modeling, it is difficult to design a microscopic structure of a porous sound absorbing material with target acoustic characteristics.

On the other hand, the design method described in the paper identifies the relational expressions between the Biot's parameters and a model of the porous sound absorbing material in advance. By the Biot's modeling, the acoustic characteristics of the porous sound absorbing material can be calculated at lower calculation costs. In addition, once the Biot's parameters of the porous sound absorbing material with the target acoustic characteristics are identified, the model of the porous sound absorbing material can be identified using the relational expressions between the Biot's parameters and the model of the porous sound absorbing material. As a result, the design method described in the paper allows designing of a microscopic structure of a porous sound absorbing material with target acoustic characteristics at lower calculation costs. By the designing method described in the paper, the porous sound absorbing material can be designed efficiently.

The design method described in the paper is however directed to the designing of a porous fibrous sound absorbing material. The designing method described in the paper is not applicable as it is to the designing of a porous sound absorbing material made of a foamed resin such as urethane resin.

The technique disclosed herein allows efficient designing of a foamed resin sound absorbing material.

SUMMARY

The technique disclosed herein relates to a method of designing the internal structure of a foamed resin sound absorbing material. The design method includes:
setting a microscopic structure model with a periodic and homogeneous structure equivalent to an internal structure of the foamed resin sound absorbing material;
calculating an acoustic characteristic by homogenization for each of a plurality of microscopic structure models, each being the microscopic structure model, sampled within a range of designing the foamed resin sound absorbing material;
identifying a relational expression between a Biot's parameter of the foamed resin sound absorbing material and the microscopic structure model based on the acoustic characteristic calculated;
setting a target acoustic characteristic that is a design target of the foamed resin sound absorbing material;
identifying a Biot's parameter for achieving the target acoustic characteristic set, by Biot's modeling; and
identifying a microscopic structure model corresponding to the Biot's parameter identified, using the relational expression.

DETAILED DESCRIPTION OF THE DRAWINGS

Figure 1:
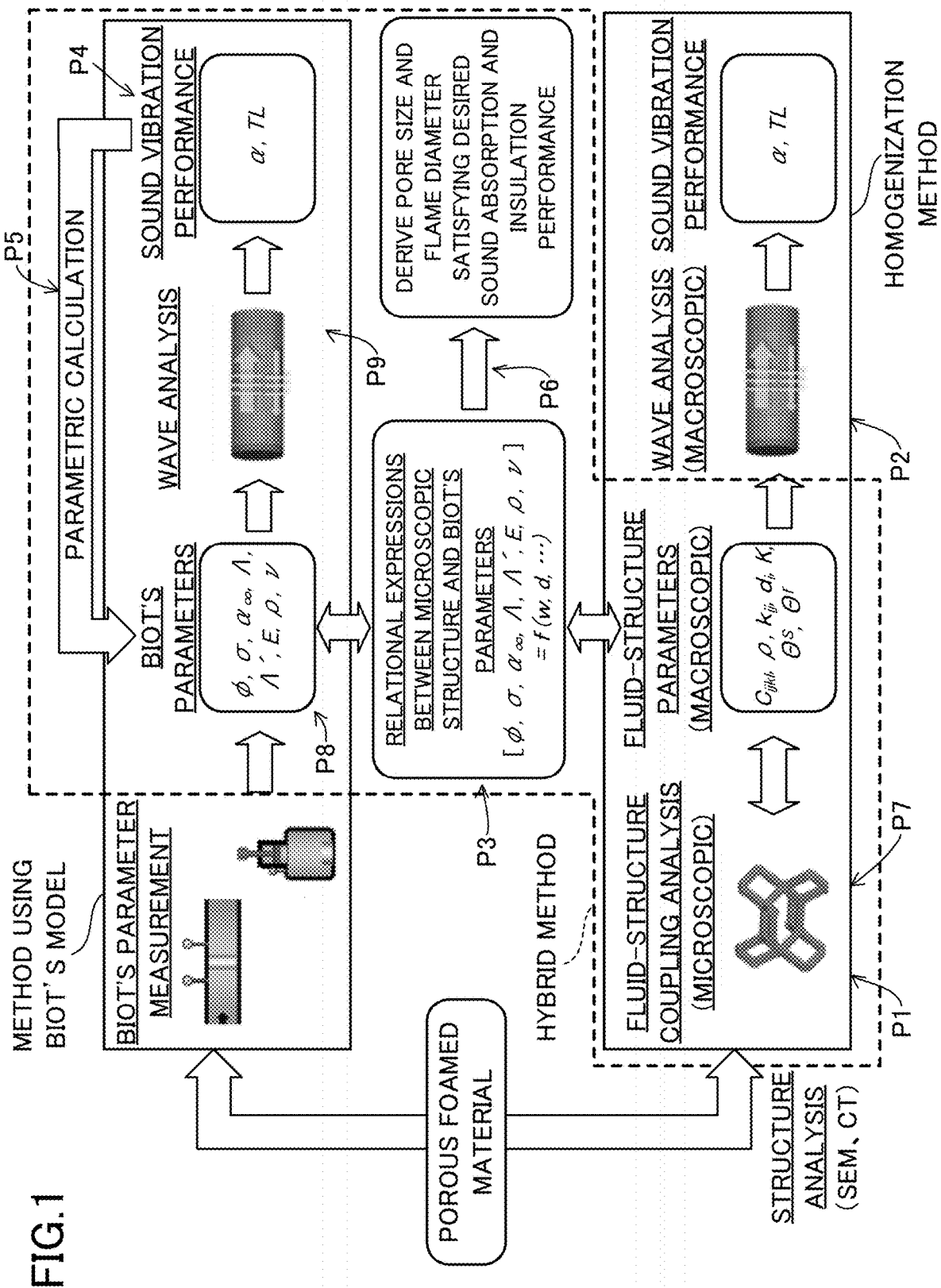
FIG. 1 illustrates a method of designing a sound absorbing material disclosed herein.

Specifically, the technique disclosed herein relates to a method of designing the internal structure of a foamed resin sound absorbing material. The design method includes:

setting a microscopic structure model with a periodic and homogeneous structure equivalent to an internal structure of the foamed resin sound absorbing material;

calculating an acoustic characteristic by homogenization for each of a plurality of microscopic structure models, each being the microscopic structure model, sampled within a range of designing the foamed resin sound absorbing material;

identifying a relational expression between a Biot's parameter of the foamed resin sound absorbing material and the microscopic structure model based on the acoustic characteristic calculated;

setting a target acoustic characteristic that is a design target of the foamed resin sound absorbing material;

identifying a Biot's parameter for achieving the target acoustic characteristic set, by Biot's modeling; and identifying a microscopic structure model corresponding to the Biot's parameter identified, using the relational expression.

The steps of this design method can be implemented by utilization of a general-purpose computer, for example.

This design method is a combination of the homogenization and the Biot's modeling. In this design method, first, a microscopic structure model of a foamed resin sound absorbing material to be designed is set. The internal structure of the foamed resin sound absorbing material to be designed is analyzed to determine a microscopic structure model suitable for the internal structure. The parameters, for example, necessary for specifying the microscopic structure model are then input to the computer to set the microscopic structure model.

The foamed resin may be a urethane resin, for example.

The microscopic structure model corresponding to the foamed resin sound absorbing material may use a Kelvin cell, for example. For example, a urethane resin often has continuous air bubbles. A Kelvin cell includes quadrangles and hexagons of bar-like ligaments. The Kelvin cell is suitable for a microscopic structural model of a foamed resin including a urethane resin.

Once the microscopic structure model is set, the acoustic characteristics are calculated by the homogenization. In this step, a plurality of microscopic structure models are sampled within a range of designing the foamed resin sound absorbing material, and the acoustic characteristics are calculated for each of the sampled microscopic structure models. In this step, for example, the acoustic characteristics may be calculated for each of a plurality of microscopic structure models including unit cells in different sizes and/or a plurality of microscopic structure models with different porosities.

A plurality of microscopic structure models can be sampled by inputting, to the computer, different numerical values as sizes and/or porosities of the unit cells. The computer solves the governing equation of each sampled microscopic structure model to calculate the acoustic characteristic of the microscopic structure model.

Once the acoustic characteristics for the plurality of sampled microscopic structure models are calculated, the relational expression between the Biot's parameters and the microscopic structure models are identified based on the calculated acoustic characteristics.

Specifically, among the Biot's parameters, the porosity $\varphi$ can be directly derived from the unit cell structure of the microscopic structure model.

Among the Biot's parameters, the airflow resistivity $\sigma$, the apparent Young's modulus E, and the apparent Poisson's ratio $\nu$ can be directly derived by the homogenization.

Among the Biot's parameters, regarding the Tortuosity $\alpha_\infty$, the viscous characteristic length $\Lambda$, and the thermal characteristic length $\Lambda'$, its equivalent density and equivalent volume elastic modulus can be obtained by the homogenization, and identified using the least square method by comparison with a Biot's model (e.g., a Johnson-Champoux-Allard model) expression.

The computer identifies the relational expressions between the Biot's parameters and the microscopic structure model. The storage of the computer stores the identified relational expressions. The steps described so far relate to preparation prior to designing of the foamed resin sound absorbing material.

After completion of the process related to the preparation, target acoustic characteristics are set as design targets of the foamed resin sound absorbing material. The target acoustic characteristics include a target sound absorption coefficient, for example. The target acoustic characteristics are set through input of the target acoustic characteristics to the computer.

Once the target acoustic characteristics are set, the Biot's parameters for achieving the set target acoustic characteristics are identified by the Biot's modeling. Various known algorithms may be used to identify the Biot's parameters. The computer identifies the Biot's parameters for achieving the set target acoustic characteristics in accordance with a preset algorithm. The calculation for identifying the Biot's parameters requires a relatively low load. The computer identifies the Biot's parameters capable of achieving the target acoustic characteristics in a relatively short time.

Once the Biot's parameters are identified, the microscopic structure model corresponding to the identified Biot's parameters is identified using the relational expressions described above. That is, the microscopic structure model for achieving the target acoustic characteristics can be identified. The computer identifies the microscopic structure model using the stored relational expressions. That is, the microscopic structure of the foamed resin sound absorbing material for achieving the target acoustic characteristics can be identified.

As described above, this design method reduces the calculation load by the Biot's modeling. In addition, the microscopic structure model capable of achieving the target acoustic characteristics can be identified by the homogenization. This design method allows efficient designing of a foamed resin sound absorbing material.

The relational expressions between the Biot's parameters and the microscopic structure model may be expressed as follows.

$$\alpha_\infty = 1.43 - 0.43\varphi$$

$$\sigma = 3.88 \times 10^{-3} w_f^{-2}(1-\varphi)^{0.355} \ [\text{Pa} \cdot \text{s}/\text{m}^2]$$

$$\Lambda = 0.094 w_f (1-\varphi)^{-0.359} \ [\text{m}]$$

$$\Lambda' = 0.383 w_f (1-\varphi)^{-0.149} \ [\text{m}]$$

-continued $$E = \frac{2(1-\varphi)^2}{3(1.9-0.9\varphi)}E_0 \text{ [Pa]}$$

$$v = \frac{\varphi}{2(2-\varphi)}$$

Here, the parameters included in the relational expressions are as follows.

$\alpha_\infty$ is a tortuosity, $\Lambda$ is a viscous characteristic length, $\varphi$ is a porosity, $\Lambda'$ is a thermal characteristic length, $\sigma$ is an airflow resistivity, E is an apparent Young's modulus, $w_f$ is a cell size, $E_0$ is a Young's modulus of the material, and $v$ is a Poisson's ratio.

These relational expressions are associated with the foamed resin sound absorbing material.

Another technique disclosed herein relates to a device for designing the internal structure of a foamed resin sound absorbing material. The design device includes:

an arithmetic circuit; a storage; and an interface, wherein the storage stores a relational expression between a Biot's parameter of the foamed resin sound absorbing material and a microscopic structure model with a periodic and homogeneous structure equivalent to the internal structure of the foamed resin sound absorbing material, the relational expression is specified, based on an acoustic characteristic calculated by homogenization, for each of a plurality of microscopic structure models, each being the microscopic structure model, sampled within a range of designing the foamed resin sound absorbing material, and the arithmetic circuit:

identifies a Biot's parameter for achieving a target acoustic characteristic by Biot's modeling based on the target acoustic characteristic that is a design target, of the foamed resin sound absorbing material, and that is input through the interface; and identifies a microscopic structure model corresponding to the Biot's parameter identified, using the relational expression, and outputs the microscopic structure model identified, through the interface.

This design device allows efficient designing of a foamed resin sound absorbing material as described above.

The technique disclosed herein relates to a method of calculating an acoustic characteristic of a foamed resin sound absorbing material. This method includes:

setting a microscopic structure model with a periodic and homogeneous structure equivalent to an internal structure of the foamed resin sound absorbing material;

calculating the acoustic characteristic by homogenization for each of a plurality of microscopic structure models, each being the microscopic structure model, sampled within a range of calculating the foamed resin sound absorbing material;

identifying a relational expression between a Biot's parameter of the foamed resin sound absorbing material and the microscopic structure model based on the acoustic characteristic calculated;

specifying the internal structure of the foamed resin sound absorbing material whose acoustic characteristic is to be calculated;

identifying a Biot's parameter corresponding to the internal structure specified, using the relational expression; and identifying an acoustic characteristic corresponding to the Biot's parameter identified, by Biot's modeling.

Once the internal structure of the foamed resin sound absorbing material is specified, this calculation method allows calculation of the acoustic characteristics of the foamed resin sound absorbing material in a shorter time than the calculation by the homogenization. The steps of this calculation method can be implemented by utilization of a general-purpose computer, for example.

Now, an embodiment of a method of designing a sound absorbing material, a device of designing the same, and a method of calculating the acoustic characteristics of the sound absorbing material disclosed herein will be described with reference to the drawings. The methods and device described herein are illustrative only.

(Description of Method of Designing Sound Absorbing Material)

First, a method of designing a sound absorbing material will be described with reference to FIG. 1. The sound absorbing material to be designed is made of a foamed resin.

Figure 4:
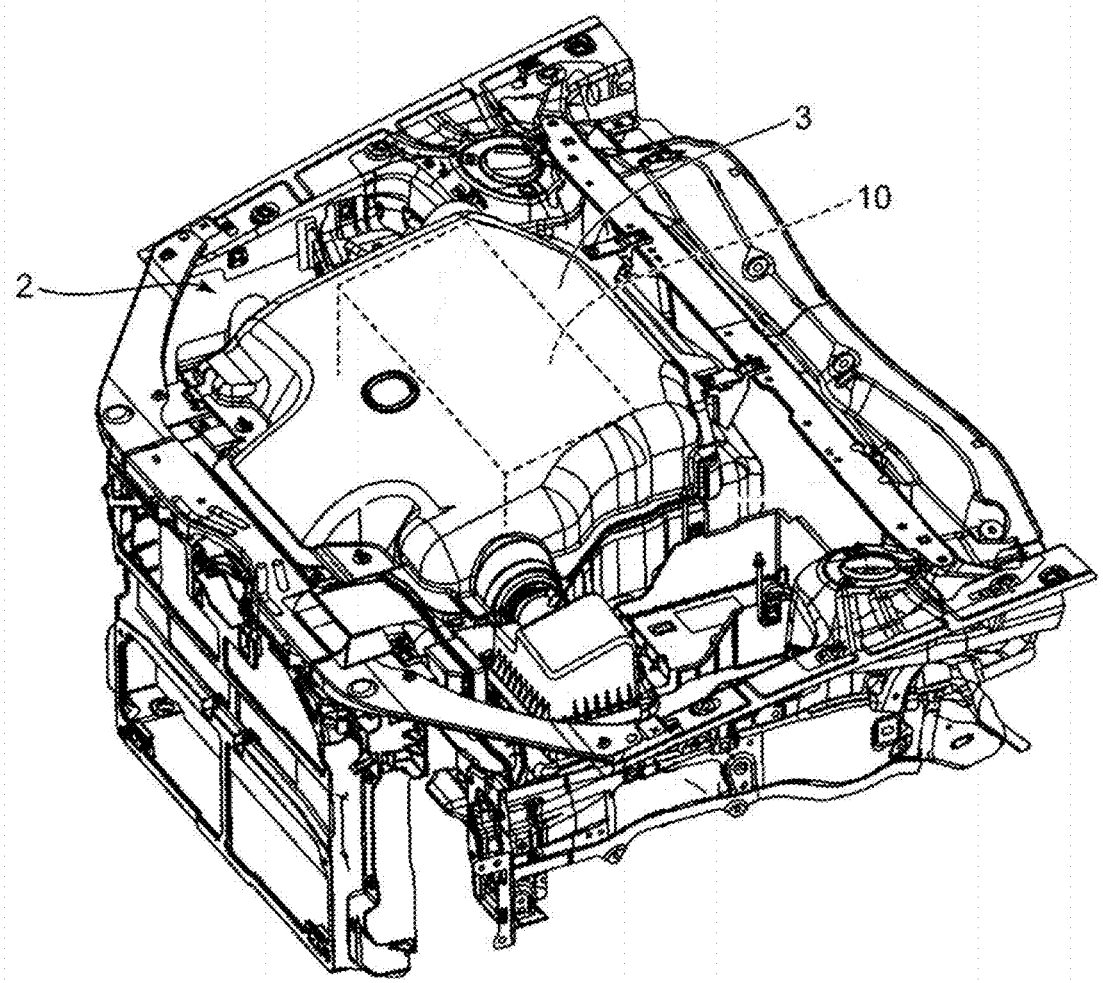
FIG. 4 is a perspective view illustrating an engine cover to which the sound absorbing material is to be applied.

The sound absorbing material is attached to an engine cover. As illustrated in FIG. 4, for example, an engine cover 3 covers an upper part of an engine 10 mounted in an engine compartment 2. Although not shown in detail, the sound absorbing material is attached to the base of the engine cover 3 so as to be interposed between the base of the engine cover 3 and the engine 10. The sound absorbing material absorbs the sound and vibration generated from the engine 10.

The sound absorbing material needs to have a low mass, a low volume, and a high sound absorption coefficient. For example, a sound absorbing material attached to an engine cover needs to efficiently absorb sound and insulate heat in a narrow space in an engine compartment. That is, the sound absorbing material needs to have a small thickness and a high sound absorption coefficient.

The design method and the design device described below are for designing, as a target, a foamed resin sound absorbing material for an engine cover. Specifically, a urethane resin is here employed as the foamed resin sound absorbing material to be designed.

The sound absorbing material to be designed is not limited to a sound absorbing material for an engine cover. The sound absorbing material may be used in various portions of an automobile. The sound absorbing material to be designed is used not only for an automobile but for various buildings, for example. In addition, the sound absorbing material to be designed may be used for sound absorption of various machines.

Although not shown, the sound absorbing material made of a foamed resin, in particular, a urethane resin has a structure including a mixture of a solid phase serving as a base and a fluid phase including a flow path with a diameter of several μm to hundreds of μm. The sound absorption characteristics depend on the microscopic structure of the foamed resin. By analytically specifying the microscopic structure of the sound absorbing material with the target sound absorbing characteristics, the sound absorbing material is designed efficiently.

The method of designing the sound absorbing material disclosed herein employs the homogenization and the Biot's modeling. The homogenization will be briefly described first, and then the Biot's modeling. After that, a design method (i.e., a hybrid method) of the homogenization and the Biot's modeling in combination will be described.

(Homogenization Method)

In the homogenization, a microscopic structure model with a periodic and homogeneous structure equivalent to the internal structure of an analysis target is set. In the microscopic structure model, the governing equations of the solid and fluid phases are solved. Accordingly, the acoustic characteristics of the analysis target are obtained including the sound absorption coefficient.

More specifically, in the homogenization, first, as shown in the lower part of FIG. 1, the internal structure of an analysis target is analyzed with a scanning electron microscope (SEM), by computed tomography (CT), or other means. Here, the analysis target is a porous foamed material, that is, a foamed resin sound absorbing material.

Based on the result of the structure analysis, a microscopic structure model corresponding to the internal structure of the analysis target is set. The microscopic structure model is obtained by setting unit cells and periodically and uniformly gathering the unit cells.

Figure 2:
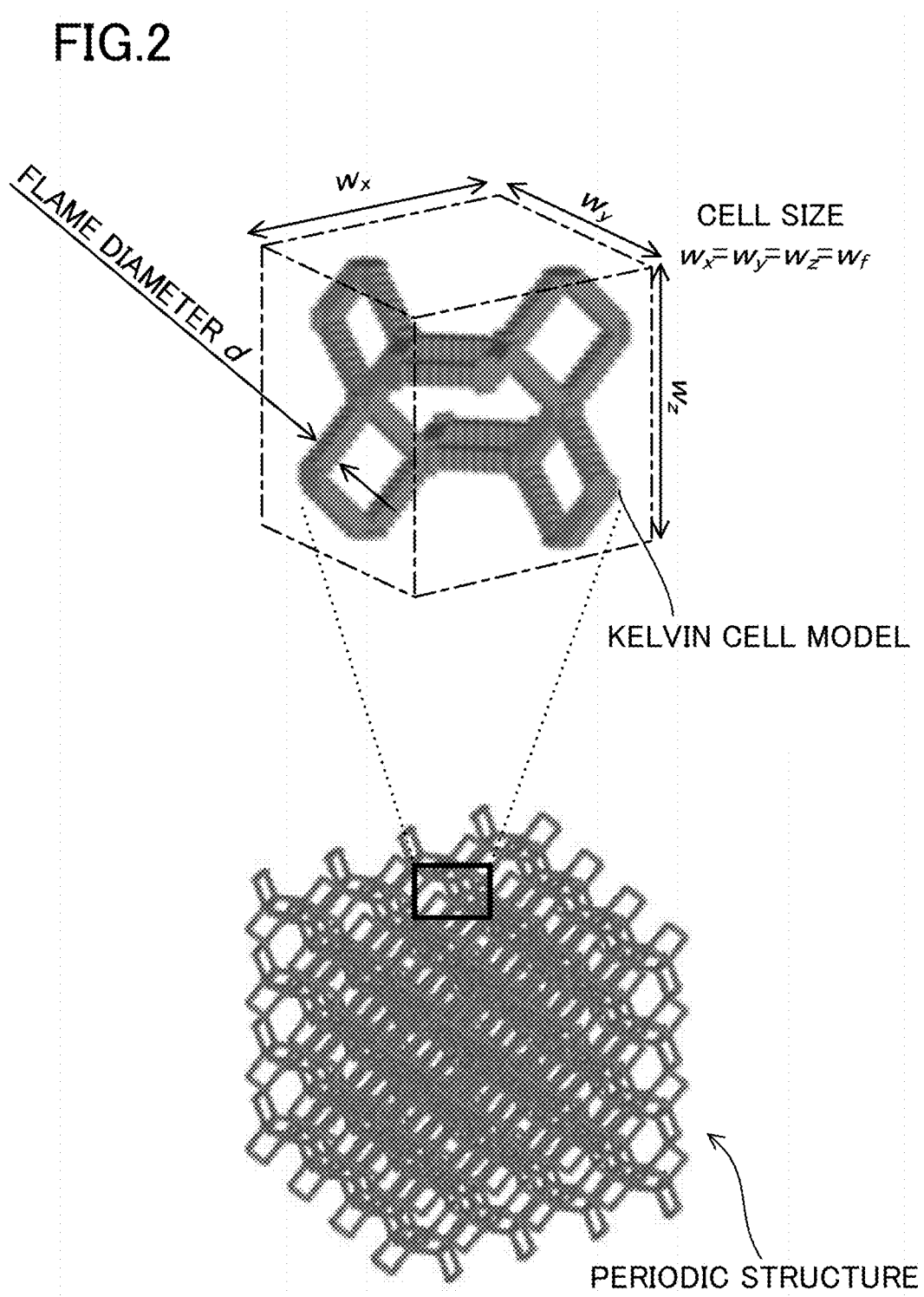
FIG. 2 illustrates a microscopic structure model.

The foamed resin used as the sound absorbing material, for example, the urethane resin employed here often has continuous air bubbles. As illustrated in FIG. 2, the unit cells are thus Kelvin cells. Each Kelvin cell includes quadrangles and hexagons of bar-like ligaments. Here, the three sides of each unit cell have the same lengths ($w_x=w_y=w_z=w_f$), and the quadrangular and hexagonal pores have the sizes of about ⅓ $w_f$ and ⅔ $w_f$, respectively.

Once the microscopic structure model is set, the relationship (i.e., the sound vibration performance) between the frequency and the sound absorption coefficient $\alpha$ and/or the transmission loss TL can be obtained. Specifically, in the homogenization, a solution obtained by solving the governing equations of the solid and fluid phases in a micro-scale is subjected to volume averaging to obtain macro-characteristics such as an equivalent density. In addition, by averaging the governing equations in the micro-scale, the governing equations of the solid and fluid phases in the macro-scale can be derived and solved to obtain the acoustic performance such as the sound absorption coefficient.

Details of the homogenization extended to be applicable to a porous sound absorbing material are described in the following document.

Yamamoto, T., Maruyama, S., Terada, K., Izui, K. and Nishiwaki, S., A generalized macroscopic model for sound-absorbing poroelastic media using a homogenization method, Computer Methods in Applied Mechanics and Engineering, Vol. 200, (2011), pp. 251-264.

This document relates to a porous fibrous sound absorbing material. With respect to a foamed resin, more specifically, a urethane resin as well, the relationship between the frequency and the sound absorption coefficient $\alpha$ and/or the transmission loss TL can be obtained by the homogenization described in the document.

By the homogenization, the correspondence between the microscopic structure of the analysis target and the acoustic characteristics can be checked. Solving the governing equations by the homogenization requires however a higher calculation load of the computer. In order to obtain acoustic characteristics by the homogenization, a long calculation time is required. It is thus inefficient to design a foamed resin sound absorbing material only by the homogenization.

(Method Using Biot's Modeling)

In the Biot's modeling, the Biot's parameters indicating the macro-characteristics of the material of an analysis target is experimentally identified to solve a wave equation.

Specifically, as shown in the upper part of FIG. 1, the Biot's parameters related to the solid and fluid phases of the analysis target are experimentally obtained using peculiar experimental equipment. The Biot's parameters related to the fluid phase specifically include the airflow resistivity $\sigma$, the porosity $\varphi$, the tortuosity $\alpha_\infty$, the viscous characteristic length $\Lambda$, and the thermal characteristic length $\Lambda'$. The Biot's parameters related to the solid phase include the Young's modulus E, the loss factor $\eta$, and the Poisson's ratio $\nu$.

Once the Biot's parameters of the foamed resin, more specifically, the urethane resin are measured, the relationship (i.e., the sound vibration performance) between the frequency and the sound absorption coefficient $\alpha$ and/or the transmission loss TL can be obtained at a relatively low calculation load using the Biot's parameters.

By the Biot's modeling, the acoustic characteristics of the analysis target can be obtained at relatively low calculation costs. However, the Biot's modeling fails to handle the microscopic structure of an analysis target.

(Hybrid Method)

As described above, the homogenization has the advantage of directly handling the microscopic structure of the analysis target, but the disadvantage of a higher calculation load. On the other hand, the Biot's modeling has the advantage of a lower calculation load, but the disadvantage of failing to handle the microscopic structure of an analysis target.

To address the disadvantages, the hybrid method disclosed herein is a combination of the homogenization and the Biot's modeling, which enables the calculation of the acoustic characteristics at a lower calculation load and the handling of the microscopic structure of an analysis target. As a result, this hybrid method allows efficient designing of the foamed resin sound absorbing material.

Specifically, the hybrid method includes steps P1 to P6 surrounded by a broken line in FIG. 1. Steps P1 to P6 of this hybrid method can be implemented by utilization of a general-purpose computer, for example.

In the first step P1, a microscopic structure model is set which has a periodic and homogeneous structure equivalent to the internal structure of the foamed resin sound absorbing material to be analyzed. This step P1 is the same as the step of setting the microscopic structure model in the homogenization described above. Specifically, if the analysis target is a urethane resin sound absorbing material, a microscopic structure model using a Kelvin cell can be set as illustrated in FIG. 2. The microscopic structure model is set by inputting parameters, for example, necessary for specifying the microscopic structure model to the computer.

In the next step P2, the acoustic characteristics of each of the microscopic structure models are calculated by the homogenization. The microscopic structure models are sampled within a range of designing the foamed resin sound absorbing material. This step P2 is also the same as in the homogenization described above. The microscopic structure models can be sampled by inputting different numerical values as the sizes and/or porosities of the unit cells into the computer.

In this step P2, the governing equations of the solid and fluid phases are solved in each of the microscopic structure models to obtain the macro-characteristics. At the same time, the governing equations of the solid and fluid phases in the macro-scale derived from the governing equations in the micro-scale are solved to obtain the acoustic performance Step P2 is executable using the computer.

Step P2 requires a higher calculation load and a longer calculation time. As will be described later, this step P2 is performed for calculating the relational expressions between the Biot's parameters and the microscopic structure model, and is a preparation process for designing the foamed resin sound absorbing material. The hybrid method does not perform this step with a higher calculation load in actual designing and thus requires a shorter time for designing.

The number of the samplings of the microscopic structure models may be set as appropriate. As an example, tens to hundreds of samplings may be performed. More specifically, for example, fifty samplings may be performed where the urethane resin applicable to the engine cover 3 has a cell size $w_f$ within the design range of 1 µm≤$w_f$≤1 mm and a porosity φ (or a flame size d) within the design range of 0.905≤φ≤0.992.

In the next step P3, the relational expressions between the Biot's parameters of the foamed resin sound absorbing material and the microscopic structure model are identified based on the acoustic characteristics calculated for each sampling. A technique of identifying the relational expressions between the Biot's parameters and the microscopic structure model are described in the documents (Yamamoto et al. (2011) and Yamamoto (2018)). The techniques described in these documents are for identifying the relational expressions between the Biot's parameters of a fibrous sound absorbing material and a microscopic structure model. This technique is also applicable to the identification of the relational expressions between the Biot's parameters of a foamed resin sound absorbing material and a microscopic structure model. Step P3 is also executable using the computer.

Specifically, the porosity φ can be directly derived from the unit cell structure, that is, the cell size $w_f$ and the flame diameter d as shown in FIG. 2.

Each of the airflow resistivity σ, the apparent Young's modulus E and the apparent Poisson's ratio ν can be directly derived by homogenization.

Regarding the tortuosity $α_∞$, the viscous characteristic length Λ, and the thermal characteristic length Λ', its equivalent density and equivalent volume elastic modulus can be obtained by the homogenization, and identified using the least square method by comparison with a Biot's model (e.g., a Johnson-Champoux-Allard model) expression.

Through the step P3, the relational expressions are identified between the Biot's parameters of the foamed resin sound absorbing material and the microscopic structure model. The relational expressions between the Biot's parameters of the foamed resin sound absorbing material, more specifically, the urethane resin sound absorbing material and the microscopic structure model can be identified as follows.

$$α_∞ = 1.43 - 0.43φ$$

$$σ = 3.88 \times 10^{-3} w_f^{-2}(1-φ)^{0.355} \ [\text{Pa·s/m}^2]$$

$$Λ = 0.094 w_f (1-φ)^{-0.359} \ [\text{m}]$$

$$Λ' = 0.383 w_f (1-φ)^{-0.149} \ [\text{m}]$$

$$E = \frac{2(1-φ)^2}{3(1.9 - 0.9φ)} E_0 \ [\text{Pa}]$$

$$ν = \frac{φ}{2(2-φ)}$$

As described above, φ is a porosity, $w_f$ is a cell size, $α_∞$ is a tortuosity, σ is an airflow resistivity, Λ is a viscous characteristic length, Λ' is a thermal characteristic length, E is an apparent Young's modulus, $E_0$ is a Young's modulus of the material, and ν is a Poisson's ratio. Each expression includes φ and $w_f$, and the Biot's parameters and the microscopic structure model associated with each other.

Once the relational expressions are identified, the preparation step is completed. The relational expressions are stored in, for example, a storage unit of a computer.

Steps P4 to P6 in FIG. 1 correspond to designing steps. First, in step P4, target acoustic characteristic are set, which are the design targets of the foamed resin sound absorbing material. That is, a target frequency and a target sound absorption coefficient α are set. In this step P4, the thickness of the sound absorbing materials is also set. The parameters related to the target frequency, the target sound absorption coefficient α, and the thickness of the sound absorbing material are input to the computer.

In the next step P5, the Biot's parameters for achieving the set target acoustic characteristics are identified by the Biot's modeling. In step P6, the microscopic structure model corresponding to the identified Biot's parameters is identified using the relational expressions. Specifically, the computer obtains a microscopic structure model (i.e., with the porosity φ and/or the cell size $w_f$) for obtaining the maximum objective function in the relational expressions using a predetermined algorithm, for example, a genetic algorithm. In designing a foamed resin sound absorbing material for an engine cover, the objective function may be, for example, an average of the normal incidence sound absorption coefficient at 1 kHz to 5 kHz. For example, only the cell size $w_f$ may be a design variable. In this manner, the microscopic structure model for achieving the target acoustic characteristics can be identified by steps P5 and P6.

The calculations in steps P5 and P6 require a lower calculation load than the calculation in step P2. A shorter time is required for designing. The microscopic structure model for achieving the target acoustic characteristics, that is, the cell size $w_f$ and/or the porosity φ can be identified in a relatively short time. By this hybrid method, a designer efficiently designs a porous sound absorbing material made of a foamed resin.

(Configuration of Design Device)

Figure 3:
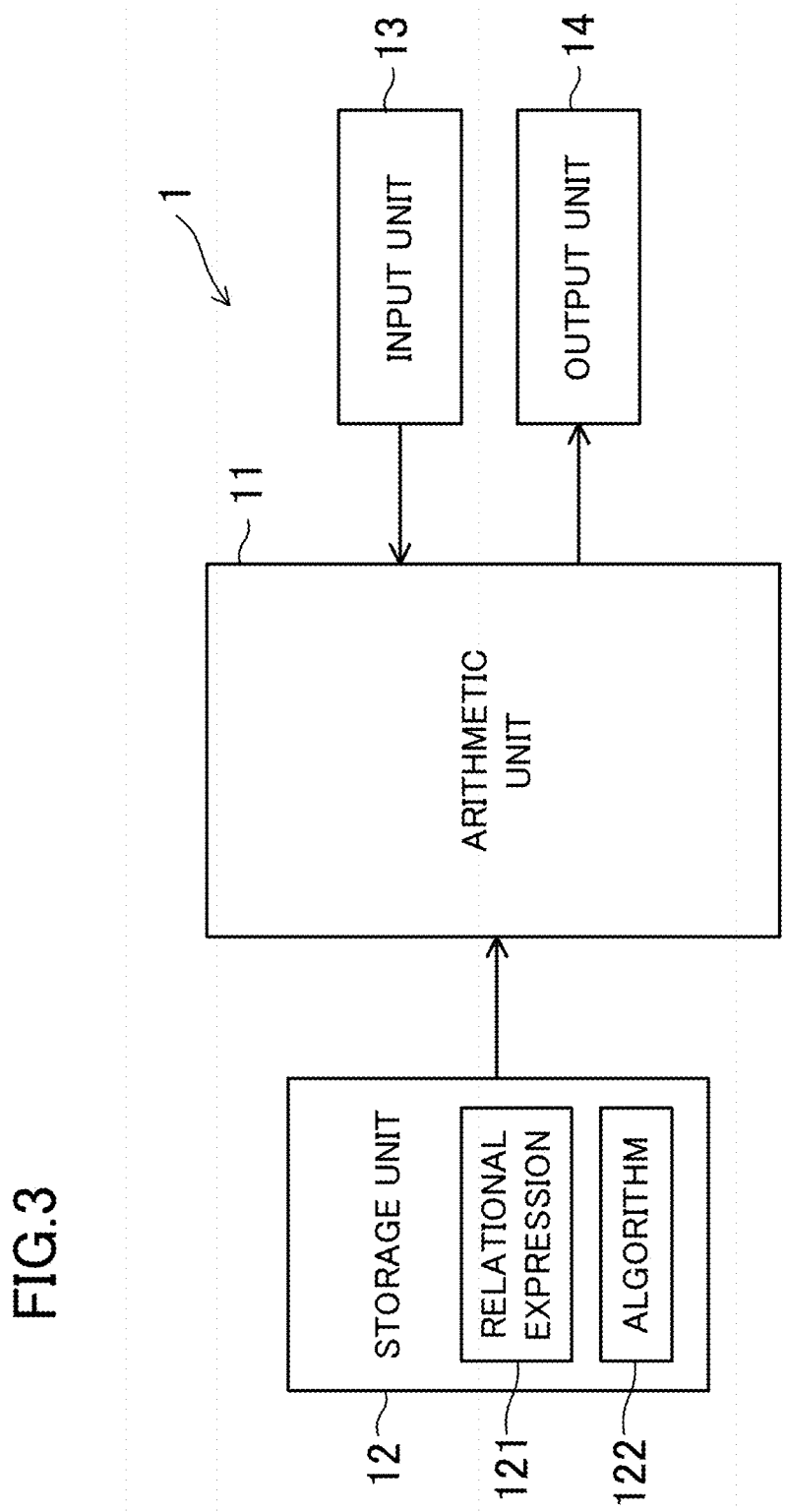
FIG. 3 is a block diagram illustrating a device for designing a sound absorbing material.

FIG. 3 illustrates a configuration of the design device 1. The design device 1 designs the internal structure of the foamed resin sound absorbing material by the hybrid method described above.

The design device 1 includes an arithmetic unit 11, a storage unit 12, an input unit 13, and an output unit 14. The design device 1 is a general-purpose computer, for example.

The storage unit 12 stores relational expressions 121 between the Biot's parameters of the foamed resin sound absorbing material described above and the microscopic structure model with a periodic and homogeneous structure equivalent to the internal structure of the foamed resin sound absorbing material. The relational expressions 121 are the expressions described above, for example.

The storage unit 12 also stores an algorithm 122 used for designing the foamed resin sound absorbing material. The algorithm 122 is a genetic algorithm, for example, as described above. The storage unit 12 is, for example, a hard disk drive utilizing a magnetic disk or a solid-state drive (SSD) using a semiconductor element.

The input unit 13 is for inputting the target acoustic characteristics, which are the design targets of the foamed resin sound absorbing material, to the arithmetic unit 11. The input unit 13 may be, for example, an input device, such as a keyboard, a mouse, or a touch panel, for inputting the values of the target acoustic characteristics in accordance with an operation by the designer. The input unit 13 is not limited to these input devices.

Based on the target acoustic characteristics input through the input unit 13, the arithmetic unit 11 identifies the microscopic structure model for achieving the target acoustic characteristics using the relational expressions 121 stored in the storage unit 12. Specifically, the arithmetic unit 11 obtains the microscopic structure model for achieving the maximum objective function in the relational expressions using the algorithm 122 stored in the storage unit 12. The arithmetic unit 11 is a processor of a computer, for example.

The output unit 14 outputs the microscopic structure model for achieving the maximum objective function obtained by the arithmetic unit 11. The output unit 14 may be, for example, a display device, such as a flat panel display, for outputting visual information to the designer. The output unit 14 is not limited to these display devices. The designer grasps the specified microscopic structure model through the output unit 14.

The design device 1 with the configuration described above efficiently designs a porous sound absorbing material made of a foamed resin by the hybrid method of the homogenization and the Biot's modeling in combination.

(Other Embodiments)

The hybrid method described above of the homogenization and the Biot's modeling in combination is usable not only for designing a foamed resin sound absorbing material but also for calculating the acoustic characteristics of a foamed resin sound absorbing material. This calculation method includes, in FIG. 1,
- a step (P1) of setting a microscopic structure model with a periodic and homogeneous structure equivalent to the internal structure of the foamed resin sound absorbing material;
- a step (P2) of calculating, by homogenization, the acoustic characteristics for each of a plurality of microscopic structure models sampled within a range of calculating the acoustic characteristics of a foamed resin sound absorbing material;
- a step (P3) of identifying the relational expressions between the Biot's parameters of the foamed resin sound absorbing material and the microscopic structure model based on the calculated acoustic characteristics;
- a step (P7) of specifying the internal structure, such as the porosity $\varphi$ and the cell size $w_f$, of the foamed resin sound absorbing material whose acoustic characteristics are to be calculated;
- a step (P8) of identifying the Biot's parameters corresponding to the identified internal structure, using the relational expressions;
- a step (P9) of calculating the acoustic characteristics corresponding to the identified Biot's parameters, by the Biot's modeling (P9).

Utilizing the relational expressions between the Biot's parameters of a foamed resin sound absorbing material and a microscopic structure model, this calculation method allows calculation of the acoustic characteristics corresponding to the internal structure of the foamed resin sound absorbing material in a shorter time than the calculation by the homogenization.

The invention claimed is:

1. A hybrid method of designing an internal structure of a foamed resin sound absorbing material, the method comprising:
   setting a microscopic structure model with a periodic and homogeneous structure equivalent to the internal structure of the foamed resin sound absorbing material;
   calculating a value of an acoustic characteristic by homogenization for each of a plurality of values for a parameter of the microscopic structure model, each of the plurality of values for the parameter of the microscopic structure model being sampled within a range of designing the foamed resin sound absorbing material;
   identifying a relational expression between a Biot's parameter of the foamed resin sound absorbing material and the parameter of the microscopic structure model based on the values of the acoustic characteristic calculated;
   setting a target acoustic characteristic that is a design target of the foamed resin sound absorbing material;
   identifying a value of the Biot's parameter for achieving the target acoustic characteristic set, by Biot's modeling;
   identifying, by a processor, a value of the parameter of the microscopic structure model corresponding to the value of the Biot's parameter identified to reduce calculation load of the designing target internal structure of the foamed resin sound absorbing material, using the relational expression; and
   identifying the design of the target internal structure with the identified value of the parameter of the microscopic structure model corresponding to the value of the Biot's parameter identified, wherein the relational expression between the Biot's parameter and the parameter of the microscopic structure model includes:

$$\alpha_\infty = 1.43 - 0.43\varphi$$
$$\sigma = 3.88 \times 10^{-3} w_f^{-2}(1-\varphi)^{0.355} \ [\text{Pa}\cdot\text{s/m}^2]$$
$$\Lambda = 0.094 w_f (1-\varphi)^{-0.359} \ [\text{m}]$$
$$\Lambda' = 0.383 w_f (1-\varphi)^{-0.149} \ [\text{m}]$$
$$E = \frac{2(1-\varphi)^2}{3(1.9-0.9\varphi)} E_0 \ [\text{Pa}]$$
$$\nu = \frac{\varphi}{2(2-\varphi)}$$

where $\alpha\infty$ is a tortuosity, $\Lambda$ is a viscous characteristic length, $\varphi$ is a porosity, $\Lambda'$ is a thermal characteristic length, $\sigma$ is an airflow resistivity, E is an apparent Young's modulus, $w_f$ is a cell size, $E_0$ is a Young's modulus of a material, and $\nu$ is a Poisson's ratio.

2. The method of claim 1, wherein the microscopic structure model uses a Kelvin cell.

3. The method of claim 1, wherein the foamed resin is a urethane resin.

4. A device for designing an internal structure of a foamed resin sound absorbing material by coupling homogenization with Biot's model, the device comprising:
   an arithmetic circuit; a storage communicatively connected with the arithmetic circuit; and an interface communicatively connected with the arithmetic circuit, wherein
   the storage stores a relational expression between a Biot's parameter of the foamed resin sound absorbing material and a parameter of a microscopic structure model with a periodic and homogeneous structure equivalent to the internal structure of the foamed resin sound absorbing material,
   the relational expression is specified, based on a value of an acoustic characteristic calculated by homogenization, for each of a plurality of values for a parameter of the microscopic structure models, each of the plurality of values for the parameter of the microscopic structure model being sampled within a range of designing the foamed resin sound absorbing material, and the arithmetic circuit is configured to:
identify a value of the Biot's parameter for achieving a target acoustic characteristic by Biot's modeling based on the target acoustic characteristic that is a design target, of the foamed resin sound absorbing material, and that is input through the interface; and
identify a value of the parameter of the microscopic structure model corresponding to the value of the Biot's parameter identified to reduce calculation load of the designing target internal structure of the foamed resin sound absorbing material, using the relational expression, and outputs the microscopic structure model identified, through the interface; and
identify the design of the target internal structure with the identified value of the parameter of the microscopic structure model corresponding to the value of the Biot's parameter identified, wherein
the relational expression between the Biot's parameter and the parameter of the microscopic structure model includes:

$$\alpha_\infty = 1.43 - 0.43\varphi$$
$$\sigma = 3.88 \times 10^{-3} w_f^{-2}(1-\varphi)^{0.355} \; [Pa \cdot s/m^2]$$
$$\Lambda = 0.094 w_f(1-\varphi)^{-0.359} \; [m]$$
$$\Lambda' = 0.383 w_f(1-\varphi)^{-0.149} \; [m]$$
$$E = \frac{2(1-\varphi)^2}{3(1.9-0.9\varphi)} E_0 \; [Pa]$$
$$v = \frac{\varphi}{2(2-\varphi)}$$

where $\alpha\infty$ is a tortuosity, $\Lambda$ is a viscous characteristic length, $\varphi$ is a porosity, $\Lambda'$ is a thermal characteristic length, $\sigma$ is an airflow resistivity, E is an apparent Young's modulus, $w_f$ is a cell size, $E_0$ is a Young's modulus of a material, and $v$ is a Poisson's ratio.

5. The device of claim 4, wherein
the microscopic structure model uses a Kelvin cell.

6. The device of claim 4, wherein
the foamed resin is a urethane resin.

7. A hybrid method of calculating an acoustic characteristic of a foamed resin sound absorbing material, the method comprising:
setting a microscopic structure model with a periodic and homogeneous structure equivalent to an internal structure of the foamed resin sound absorbing material;
calculating a value of the acoustic characteristic by homogenization for each of a plurality of values for a parameter of the microscopic structure models, each of the plurality of values for the parameter of the microscopic structure model being sampled within a range of calculating the foamed resin sound absorbing material;
identifying a relational expression between a Biot's parameter of the foamed resin sound absorbing material and the parameter of the microscopic structure model based on the values of the acoustic characteristic calculated;
setting a value of a target internal structure of the microscopic structure model for the foamed resin sound absorbing material whose acoustic characteristic is to be calculated;
identifying, by a processor, a value of the Biot's parameter correspond to the value of the target internal structure set to reduce calculation load of calculating an acoustic characteristic of the foamed resin sound absorbing material with the target internal structure, using the relational expression; and
identifying the acoustic characteristic of the foamed resin sound absorbing material with the target internal structure correspond to the value of the Biot's parameter identified, by Biot's modeling, wherein
the relational expression between the Biot's parameter and the parameter of the microscopic structure model includes:

$$\alpha_\infty = 1.43 - 0.43\varphi$$
$$\sigma = 3.88 \times 10^{-3} w_f^{-2}(1-\varphi)^{0.355} \; [Pa \cdot s/m^2]$$
$$\Lambda = 0.094 w_f(1-\varphi)^{-0.359} \; [m]$$
$$\Lambda' = 0.383 w_f(1-\varphi)^{-0.149} \; [m]$$
$$E = \frac{2(1-\varphi)^2}{3(1.9-0.9\varphi)} E_0 \; [Pa]$$
$$v = \frac{\varphi}{2(2-\varphi)}$$

where $\alpha\infty$ is a tortuosity, $\Lambda$ is a viscous characteristic length, $\varphi$ is a porosity, $\Lambda'$ is a thermal characteristic length, $\sigma$ is an airflow resistivity, E is an apparent Young's modulus, $w_f$ is a cell size, $E_0$ is a Young's modulus of a material, and $v$ is a Poisson's ratio.

8. The method of claim 7, wherein
the microscopic structure model uses a Kelvin cell.

9. The method of claim 7, wherein
the foamed resin is a urethane resin.

* * * * *